3,806,501
PROTEIN PRODUCT AND PROCESS OF PREPARING IT WHICH COMPRISES REACTING POULTRY FEATHER MEAL, LIME AND SODIUM SULFIDE
John W. Rymer, 8285 Hewlitt Road, Dunwood, Ga. 30338, and Thomas J. Peters, 1108 Willivee Drive, Decatur, Ga. 30033
No Drawing. Filed Nov. 7, 1972, Ser. No. 304,471
Int. Cl. A23j 1/10
U.S. Cl. 260—123.7
10 Claims

ABSTRACT OF THE DISCLOSURE

A process of producing a protein product comprising the steps of heating a reaction mixture of 10 parts by weight of poultry feather meal to 1-2 parts lime (CaO) and to 2-3 parts sodium sulfide ($Na_2S$) and of 7-10 gallons of water to 10 pounds of poultry feather meal to a temperature range of 190°-212° F. for 3-5 hours; cooling the mixture to a pH range of 6.8-7.2 with an acid; and separating the sludge from the mixture to produce a clear water soluble product.

A protein product produced by the above process.

BACKGROUND OF THE INVENTION

Various methods have been used to produce a protein product from keratinous materials such as feathers, hair and the like. One of the problems of these prior art processes is that it was difficult to produce a neutral product economically. Moreover, these processes generally produced a product not appreciably soluble in water thereby reducing its usefulness in food and beverage products. Also, most prior processes required complicated and expensive techniques for the carrying out of the process and/or preparing the raw material for the process.

SUMMARY OF THE INVENTION

These and other problems associated with the prior art are overcome by the invention disclosed herein by providing a process and product which is inexpensive, has a high protein yield and which is simple to use. The product has wide use capability as a protein source in the food and beverage industry as well as the cosmetic and drug industries.

The process of the invention includes the steps of hydrolyzing a mixture of poultry feather meal, water, lime and sodium sulfide for a predetermined period of time at an elevated temperature; cooling the mixture to stop the reaction and neutralizing the mixture to a predetermined pH range. The particulate sludge may be subsequently separated from the liquid.

The product is a liquid keratin composition produced by hydrolyzing poultry feather meal with a mixture of water, lime and sodium sulfide for a predetermined period of time at an elevated temperature, cooling the reacted product to stop the reaction, neutralizing the product, and separating the sludge therefrom.

DETAILED DESCRIPTION OF ILLUSTRATIVE EMBODIMENTS

The process uses as its basic protein producing material a keratinous by-product of poultry processing operations commonly known as hydrolyzed feather meal and is commercially available. Such poultry feather meal has a general analysis of minimum protein content of 85%, a minimum fat content of 1% and a maximum fiber content of 3%. A more complete chemical composition is not now available. One such product is manufactured by J. D. Jewell, Inc. of Gainesville, Ga.

A reaction mixture of poultry feather meal, water, lime (CaO) and sodium sulfide ($Na_2S$) is hydrolyzed in a closed vessel at an elevated temperature under agitation. When the reaction is complete, it is cooled below reaction temperature. The solution is then neutralized with acid and the sludge separated from the liquid. The protein solids level in the liquid may be controlled by uncovering the vessel during a portion of the reaction time. The resulting product is chemically stable and is water soluble for use as a protein additive to foods, beverage, cosmetic and/or drugs.

The reaction mixture has the proportions 10 parts of poultry feather meal to 1-2 parts lime (CaO) and 2-3 parts sodium sulfide ($Na_2S$) by weight. The proportions of water to poultry feather meal is 7-10 gallons of water to 10 pounds of poultry feather meal. The reaction mixture has preferably 1.5 parts by weight of lime (CaO), and 2.5 parts by weight of sodium sulfide ($Na_2S$) to 10 parts by weight of poultry feather meal. Preferably 8.3 gallons of water are used with 10 pounds of poultry feather meal.

The reaction temperature range is preferably 190°–212° F. The reaction time is sufficient to break down the protein bearing portions of the poultry feather meal and is preferably 3–5 hours. In order to stop reaction, it is preferable to reduce the temperature to 120° F. or below. The protein solids level in the reaction mixture can be controlled by evaporation and is preferable at 45–55% after separation of the sludge. Further evaporation or other types of separation techniques may be used to remove the suspended protein solid from the solution and produce a dry compound.

The resulting compound of the process is disclosed as a liquid with the protein solids suspended therein. The compound has an amber color and is clear. The specific molecular structure is not known. The compound is water soluble but may be mixed with oil base compounds by emulsification using known techniques.

While various vessels may be used to carry out the process, a stainless steel kettle having a steam jacket has been successfully used to do so. The kettle has a cover for closing the mixture chamber during reaction time.

For increasing the protein solids level, the cover of the vessel is removed preferably after 3 hours of reaction time and the liquids allowed to evaporate. Samples of the reaction mixture are periodically taken, cooled to below reaction temperature, neutralized with an acid, filtered to remove the sludge, and a protein solids level reading taken by conventional means such as a refractometer to determine the solids level. This process is repeated until the desired protein solids level is achieved. The evaporation process is maintained for approximately 2 hours to obtain a protein solids level of 45 to 55%.

When the desired solids level is achieved, the mixture is cooled below reaction temperature and neutralized with an acid such as glacial acetic acid. The mixture is preferably neutralized to a pH range of 6.8–7.2. The neutralized mixture is then allowed to stabilize preferably from 12–24 hours and the pH range preferably readjusted to 6.8–7.2.

After the mixture has stabilized, the sludge is separated therefrom by known separation processes such as decanting or filtering to produce the clear product. The clear product may be degassified in known manner such as aeration to remove any odorous sulfide gases from the product.

EXAMPLE

Ten pounds of poultry feather meal were mixed with 8.3 gallons of water, and 1.5 pounds of lime (CaO) and 2.5 pounds of sodium sulfide ($Na_2S$) added to this mixture. The reaction mixture was hydrolyzed for 3 hours with constant slow agitation in a closed steam jacketed stainless steel vessel at a temperature of 190–212° F. The vessel cover was then removed and the temperature maintained to evaporate the liquid of the mixture until a protein solids level of 45 to 50% was obtained. This was approximately 2 hours and the protein solids level was determined by cooling a sample of the mixture to a temperature below 120° F. and neutralizing the sample to a pH of 6.8–7.2 with glacial acetic acid. The sample was then filtered and a solids level reading made with a refractometer.

When the desired solids level in the reaction mixture was obtained, cold water was run through the steam jacket on the vessel to stop the reaction and cool the mixture to 120° F. or below. The mixture was then neutralized with glacial acetic acid to a pH of 6.8–7.2 and the neutralized mixture let stand for 12–24 hours at room temperature to stabilize. The pH was rechecked and adjusted to a pH of 6.8–7.2 with glacial acetic acid as necessary. The stable mixture was then filtered to remove the sludge and produce a clear product.

The resulting clear product was analyzed by ion exchange chromatography with an automated amino acid analyzer and the following amino acid composition found.

TABLE

| Amino acid | Moles/l. | Grams/l. | Amino acid residue per 1,000 residuals total |
|---|---|---|---|
| Aspartic acid | 0.345 | 45.91 | 73.52 |
| Threonine | 0.034 | 4.05 | 7.25 |
| Serine | 0.078 | 8.20 | 16.62 |
| Glutamic acid | 0.519 | 76.36 | 110.60 |
| Proline | 0.684 | 78.75 | 145.76 |
| Glycine | 0.937 | 70.34 | 199.67 |
| Alanine | 0.527 | 46.95 | 112.30 |
| Cystine | 0.036 | 8.65 | 7.67 |
| Valine | 0.446 | 52.25 | 94.04 |
| Methionine | 0.061 | 9.10 | 13.00 |
| Isoleucine | 0.203 | 26.62 | 43.26 |
| Leucine | 0.421 | 55.22 | 89.72 |
| Tyrosine | 0.079 | 14.31 | 16.83 |
| Phenylalanine | 0.191 | 31.55 | 40.70 |
| Lysine | 0.080 | 11.70 | 17.05 |
| Histidine | 0.035 | 5.43 | 7.46 |
| Arginine | 0.016 | 2.79 | 3.41 |
| Total | 4.692 | 548.17 | 1,000.00 |

Note.—Density of sample, 1.18; total weight percent of amino acids, 46.45%; total weight percent of protein, 39.29%; amino acid N percent, 5.84%.

From the ferogoing, it is understood that full use may be made of modifications, substitutions and equivalents may be made to the above disclosure without departing from the scope of the inventive concept.

We claim:
1. A process of producing a protein product comprising the steps of:
    (a) heating a reaction mixture of poultry feather meal, lime (CaO), sodium sulfide ($Na_2S$) and water to a temperature range of 190°–212° F.; and
    (b) after reaction is complete, neutralizing said mixture with an acid.
2. The process of claim 1 wherein said reaction mixture consists of 1–2 parts by weight of lime (CaO) to 10 parts by weight of poultry feather meal; 2–3 parts by weight of sodium sulfide ($Na_2S$) to 10 parts by weight of poultry feather meal; and 7–10 gallons of water to 10 pounds of poultry feather meal.
3. The process of claim 2 wherein said reaction mixture is heated for 3–5 hours to complete reaction.
4. The process of claim 3 wherein said mixture is cooled to no greater than 120° F. after reaction is complete and before neutralization.
5. The process of claim 4 wherein the protein solids level in said mixture is controlled by evaporating said mixture for a prescribed period of time.
6. The process of claim 5 further including the step of separating the sludge from said mixture after neutralization.
7. The process of claim 6 wherein said mixture is neutralized to a pH range of 6.8–7.2.
8. The process of claim 7 wherein said mixture is heated in a closed vessel for approximately 3 hours and the cover removed therefrom while heating is maintained until a protein solids level of 45–55% is obtained by evaporation.
9. A protein product prepared by the process of claim 1.
10. A protein product prepared by the process of claim 8.

References Cited

UNITED STATES PATENTS

| 2,137,365 | 11/1938 | Strong et al. | 260—123.7 X |
| 2,201,929 | 5/1940 | Speakman | 260—123.7 X |
| 2,399,161 | 4/1946 | Brother et al. | 260—123.7 X |
| 2,591,945 | 4/1952 | Koerner et al. | 260—123.7 |
| 2,597,566 | 5/1952 | Chiego | 260—123.7 |
| 3,464,825 | 9/1969 | Anker | 260—123.7 X |
| 3,642,498 | 2/1972 | Anker | 260—123.7 X |

HOWARD E. SCHAIN, Primary Examiner